US012681248B2

(12) United States Patent
Ge et al.

(10) Patent No.: US 12,681,248 B2
(45) Date of Patent: Jul. 14, 2026

(54) ELECTRICAL CONNECTION SOCKET, PHOTOELECTRIC MODULE, CAGE, AND ELECTRONIC DEVICE

(71) Applicant: HUAWEI TECHNOLOGIES CO., LTD., Shenzhen (CN)

(72) Inventors: Chongjun Ge, Nanjing (CN); Bo Yan, Shenzhen (CN); Jinxin Ge, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 595 days.

(21) Appl. No.: 18/320,372

(22) Filed: May 19, 2023

(65) Prior Publication Data

US 2023/0288654 A1 Sep. 14, 2023

Related U.S. Application Data

(63) Continuation of application No. PCT/CN2021/106234, filed on Jul. 14, 2021.

(30) Foreign Application Priority Data

Nov. 23, 2020 (CN) .......................... 202011323961.8
Dec. 11, 2020 (CN) .......................... 202011457092.8

(51) Int. Cl.
*G02B 6/42* (2006.01)
*H01R 12/70* (2011.01)
(Continued)

(52) U.S. Cl.
CPC .......... *G02B 6/428* (2013.01); *G02B 6/4256* (2013.01); *H01R 12/7088* (2013.01); *H01R 12/721* (2013.01); *H01R 13/40* (2013.01)

(58) Field of Classification Search
CPC .... G02B 6/428; G02B 6/4283; G02B 6/4284; H01R 12/7088; H01R 12/721; H01R 12/724; H01R 13/40
See application file for complete search history.

(56) References Cited

U.S. PATENT DOCUMENTS 8,740,643 B2 6/2014 Kuang et al.
9,065,230 B2 6/2015 Milbrand, Jr.
(Continued)

FOREIGN PATENT DOCUMENTS

CN 111129876 A 5/2020
CN 112736535 A 4/2021
(Continued)

OTHER PUBLICATIONS

Extended European Search Report issued in EP21893420.6, dated Sep. 4, 2024, 23 pages.
(Continued)

*Primary Examiner* — Chad H Smith

(57) ABSTRACT

An electrical connection socket includes an insulated substrate, and the insulated substrate has an upper surface, a lower surface, and a side surface. The insulated substrate includes at least one plug portion. At least two power terminals are disposed in the electric connection area. The signal connection area is provided with an electric signal slot, an opening of the electric signal slot is located on the side surface of the insulated substrate. Along a direction perpendicular to the lower surface, there is a height difference between the electrical signal slot and the connection section. The electrical connection socket can increase a distance between the power terminal and the electrical signal slot in the electrical connection socket, and increase a distance between the power terminal and a metal housing of
(Continued)

1 a module in a matching direction when the electrical connection socket is matched with the module.

11 Claims, 12 Drawing Sheets

(51) Int. Cl.
  *H01R 12/72*      (2011.01)
  *H01R 13/40*      (2006.01)

(56)                References Cited

U.S. PATENT DOCUMENTS

2013/0034994 A1* 2/2013 Kuang ................ H01R 12/721
                                                        439/607.22
2014/0205298 A1   7/2014 Moore et al.

FOREIGN PATENT DOCUMENTS

| | | | |
|---|---|---|---|
| CN | 111129876 | B | 6/2021 |
| EP | 4002772 | A1 | 5/2022 |
| EP | 4191303 | A1 | 6/2023 |
| JP | H10322730 | A | 12/1998 |
| JP | 2009194511 | A | 8/2009 |
| JP | 2010050092 | A | 3/2010 |

OTHER PUBLICATIONS

International Search Report and Written Opinion issued in PCT/CN2021/106234, dated Sep. 28, 2021, 10 pages.
Office Action issued in JP2023-530737, dated May 7, 2024, with English translation, 4 pages.
Communication pursuant to Rule 162(1) EPC issued in EP21893420.6, dated May 13, 2024, 18 pages.

* cited by examiner

100

100

100

01

1

2

2

ELECTRICAL CONNECTION SOCKET, PHOTOELECTRIC MODULE, CAGE, AND ELECTRONIC DEVICE

CROSS-REFERENCE TO RELATED APPLICATIONS

This application is a continuation of International Application No. PCT/CN2021/106234, filed on Jul. 14, 2021, which claims priority to Chinese Patent Application No. 202011323961.8, filed on Nov. 23, 2020 and Chinese Patent Application No. 202011457092.8, filed on Dec. 11, 2020. All of the aforementioned patent applications are hereby incorporated by reference in their entireties.

TECHNICAL FIELD

The present disclosure relates to the field of communication technologies, and in particular, to an electrical connection socket, a photoelectric module, a cage, and an electronic device.

BACKGROUND

When the Ethernet is used to supply power to an electronic device, an additional power over Ethernet (POE) interface needs to be disposed on the electronic device. However, the POE interface increases complexity of a structure of the electronic device, and increases a size of the electronic device. To resolve this problem, in the conventional technology, light and electricity are combined to form an integrated connection solution. In a structure shown in FIG. 1, an electronic device 100 includes an electrical connection socket 10 and an optical module 20. The electrical connection socket 10 includes an insulated substrate 101, a power terminal 102, an upper signal terminal 103, and a lower signal terminal 104, where the upper signal terminal 103 and the lower signal terminal 104 are disposed in a slot A. The optical module 20 includes a metal housing 201, and a power connection terminal 202 and a signal connection terminal 203 that are disposed on the housing 201. The power connection terminal 202 and the signal connection terminal 203 in the optical module 20 are matched with the electrical connection socket 10 in a matching direction (an arrow direction) shown in FIG. 1, to form a structure shown in FIG. 2.

However, after the electrical connection socket 10 is matched with the optical module 20 as shown in FIG. 2, a minimum distance a1 between the power terminal 102 and the upper signal terminal 103 in the electrical connection socket 10 is small and is only 0.47 mm, and shielding cannot be increased due to a long coupling path. In addition, in a structure shown in FIG. 3, when the optical module 20 is a common module with only a signal transmission function in FIG. 3, a minimum distance a2 between a metal housing 201' in the common module and the exposed power terminal 102 in the electrical connection socket 10 is also small, and does not meet a safety standard.

SUMMARY

The present disclosure provides an electrical connection socket, a photoelectric module, a cage, and an electronic device, to increase a distance between a power terminal and an electrical signal slot in the electrical connection socket, and increase a distance between the power terminal and a metal housing of a module in a matching direction when the electrical connection socket is matched with the module.

According to a first aspect, the present disclosure provides an electrical connection socket. The electrical connection socket includes an insulated substrate. The insulated substrate has an upper surface, a lower surface, and a side surface used to match with a to-be-plugged module, and the insulated substrate includes at least one plug portion. It should be understood that each of the at least one plug portion may be connected to one to-be-plugged module. Each of the at least one plug portion includes an electrical connection area used to connect to a power terminal in the to-be-plugged module and a signal connection area used to connect to a signal terminal in the to-be-plugged module. At least two power terminals are disposed in the electrical connection area, one end of each of the at least two power terminals is disposed in the insulated substrate, and the other end extends to the lower surface of the insulated substrate through the insulated substrate. It should be noted that the power terminal has a connection section used to connect to the power terminal in the to-be-plugged module, and a connection port of the connection section is located on the side surface of the insulated substrate. For the signal connection area, the signal connection area is provided with an electrical signal slot, and an opening of the electrical signal slot is located on the side surface of the insulated substrate. Therefore, in the electrical connection socket provided in the present disclosure, both the connection port of the power terminal and the connection port of the electrical signal slot are located on the side surface of the insulated substrate. It should be understood that because the connection section of the power terminal and the electrical signal slot have a distance difference in a direction perpendicular to the lower surface of the insulated substrate, the connection section of the power terminal and the electrical signal slot are arranged vertically. In view of this, a distance between the connection section and the electrical signal slot may be increased by adjusting a position of the connection section of the power terminal, to improve an electromagnetic compatibility (EMC) capability of the electrical connection socket provided in this embodiment, so that the electrical connection socket can meet an EMC certification standard. In addition, because the electrical signal slot in the electrical connection socket provided in the present disclosure exceeds the connection section on a matching interface, there is a distance difference between the connection section and the electrical signal slot in a direction perpendicular to the side surface of the insulated substrate. In view of this, in the matching direction, a distance between a metal housing in the to-be-plugged module and the power terminal can be increased, to meet a safety standard.

In a specific implementation, the insulated substrate has a concave portion whose opening is located on the side surface, and the connection port of the connection section is located on a bottom of the concave portion. The concave portion may further assist in adjusting the distance between the metal housing in the to-be-plugged module and the power terminal.

In a specific implementation, the electrical signal slot includes a first inner surface and a second inner surface that are disposed opposite to each other, and along a direction from the upper surface to the lower surface of the insulated substrate, the electrical connection socket further includes:

at least one upper signal pin, where one end of the at least one upper signal pin is located on the first inner surface, and the other end extends from an interior of the insulated substrate to the lower surface of the insulated substrate through a metal lead; and at least one lower signal pin, where one end of the at least one lower signal pin is located on the second inner surface, and the other end extends from the interior of the insulated substrate to the lower surface of the insulated substrate through the metal lead.

In a specific implementation, an extension direction of the connection section of the power terminal is parallel to an extension direction of the electrical signal slot, and along an arrangement direction of the connection section and the electrical signal slot, a distance between the connection section of the power terminal and the upper signal pin is greater than 1.4 mm. This resolves a small distance between the connection section of the power terminal and the upper signal pin, supports a transmission rate of Oct. 25, 1956 Gbps, and implements downward compatibility with a standard optical module, to meet an admission standard related to a device, and implement integrated photoelectric pluggable application of a 1U/48-port switch.

In a specific implementation, the insulated substrate includes a connection portion. The electrical connection socket provided in the present disclosure is of a single-layer structure. When the electrical connection socket provided in the present disclosure is of a single-layer structure, the insulated substrate may include a first insulated substrate and a second insulated substrate, the power terminal is disposed on the first insulated substrate, and the second insulated substrate is provided with the electrical signal slot. It is clear that the first insulated substrate and the second insulated substrate may be separated, which is easy to disassemble and assemble, or may be integrated.

In a specific implementation, the insulated substrate has a central surface, the central surface is located between the upper surface and the lower surface and is parallel to the lower surface, the insulated substrate includes two plug portions, and the two plug portions are symmetrically disposed relative to the central surface. The electrical connection socket provided in the present disclosure is of a two-layer structure, to increase density of a connector.

According to a second aspect, the present disclosure provides a photoelectric module, including a housing; and a circuit board disposed in the housing, where an electrical signal terminal is disposed on the circuit board, and the electrical signal terminal is configured to be plugged and connected to the electrical signal slot of any electrical connection socket, to transmit a signal between the photoelectric module and the electrical connection socket. The photoelectric module further includes at least two power terminals. The at least two power terminals are insulated from the housing, one end of the at least two power terminals protrudes from a front end of the housing, and another end is connected to a flexible circuit board in the housing. The at least two power terminals are electrically connected to at least two power terminals in the electrical connection socket in a one-to-one correspondence, to couple a power supply voltage to an electronic device.

The photoelectric module is adapted to a structure of the electrical connection socket provided in the present disclosure. When the photoelectric module is used as a to-be-plugged module, a connection section of each of the at least two power terminals in the electrical connection socket is correspondingly connected to the power terminals in the photoelectric module, to transmit power between the to-be-plugged module and the electrical connection socket. In addition, the electrical signal terminal in the photoelectric module may be plugged and connected to the electrical signal slot in the electrical connection socket provided in the present disclosure, to implement signal transmission.

In a specific implementation, an insulated substrate is disposed on the front end of the housing, the at least two power terminals are telescopically disposed inside the insulated substrate, one end of the at least two power terminals passes through the insulated substrate and protrudes from the housing, and another end passes through the insulated substrate and is connected to the circuit board in the housing.

In a specific implementation, the electrical signal terminal is a multi-source agreement (MSA) edge connector terminal.

In a specific implementation, the photoelectric module is a small form-factor pluggable (SFP) module.

According to a third aspect, the present disclosure provides a cage, including a cage housing and a cavity enclosed by the cage housing. The cavity is configured to accommodate any electrical connection socket and any photoelectric module in the foregoing.

According to a fourth aspect, the present disclosure provides an electronic device, including any electrical connection socket, any photoelectric module, and any cage in the foregoing. This can implement integrated photoelectric transmission and integrated plugging.

DESCRIPTION OF EMBODIMENTS

First, an application scenario of the present disclosure is described. Electronic devices such as a wireless access point (AP) device and a network camera are usually installed in an area such as an enterprise campus, an indoor ceiling, or a building wall. Because the devices are in distributed layout, obtaining power in a nearby manner increases additional user costs. Therefore, a power over Ethernet (POE) manner is usually used to supply power for the electronic devices.

When the power over Ethernet manner is used, a conventional optical module is disposed on the electronic device to connect to an optical fiber connector, and an additional POE interface further needs to be disposed on the electronic device to connect to an Ethernet connector. However, the additional POE interface disposed on the electronic device increases complexity of a structure of the electronic device, and increases a size of the electronic device.

Figure 1:
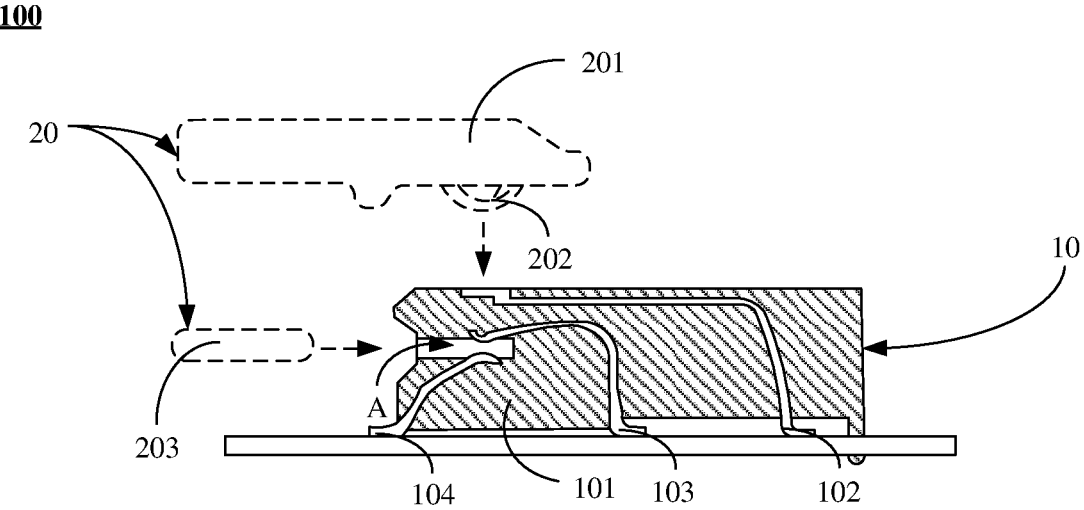
FIG. 1 is a diagram of a structure of an electronic device in the conventional technology.
Figure 2:
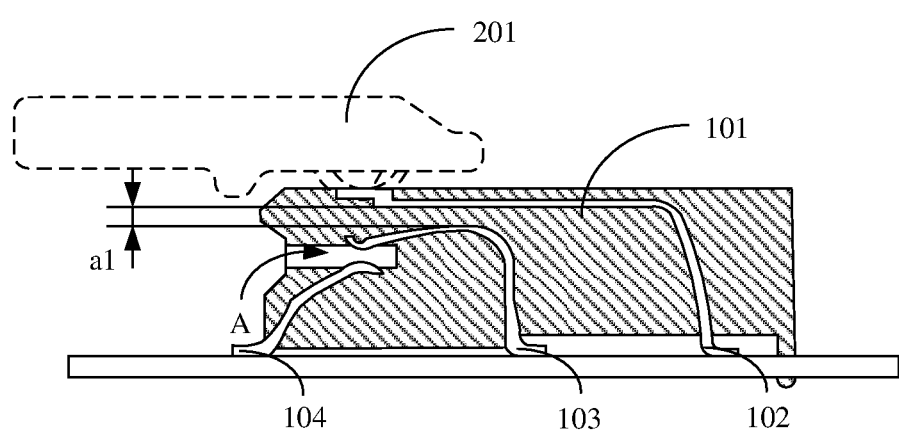
FIG. 2 is a diagram of another structure of an electronic device in the conventional technology.
Figure 3:
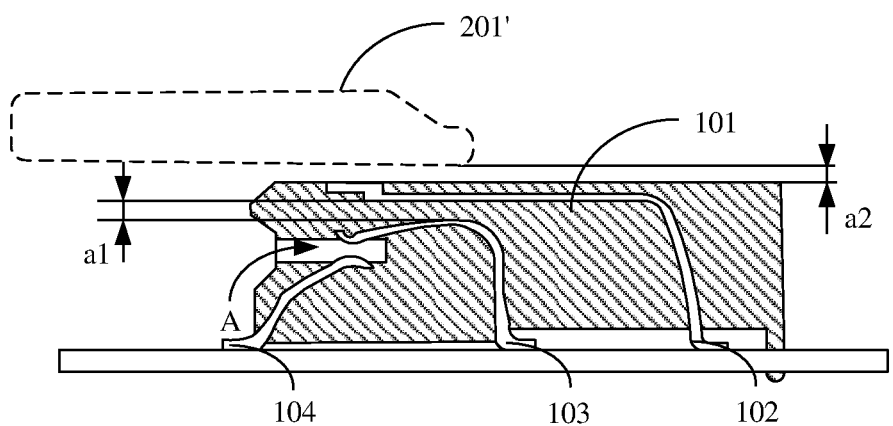
FIG. 3 is a diagram of another structure of an electronic device in the conventional technology.

To resolve this problem, in the conventional technology, light and electricity are combined to form an integrated connection solution. However, in the integrated connection solution of an electrical connection socket 10 and an optical module 20 shown in FIG. 1 and FIG. 2, an upper signal terminal 103 in the electrical connection socket 10 is easily interfered by a power supply pulse of a power terminal 102. In addition, in the solution shown in FIG. 3, when the electrical connection socket 10 is matched with a common module with only a signal transmission function, a minimum distance a2 between the exposed power terminal 102 in the electrical connection socket 10 and a metal housing 201' in the common module is also very small. The electrical connection socket 10 does not meet a safety requirement.

Based on the application scenario, the present disclosure provides an electronic device, so that all mechanical parts in the electronic device meet safety and electromagnetic compatibility (EMC) standards.

Terms used in the following embodiments are merely intended to describe specific embodiments, but are not intended to limit the present disclosure. The terms "one", "a" and "this" of singular forms used in this specification and the appended claims of the present disclosure are also intended to include expressions such as "one or more", unless otherwise specified in the context clearly.

Reference to "an embodiment", "some embodiments", or the like described in this specification indicates that one or more embodiments of the present disclosure include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The following clearly and describes the technical solutions in embodiments of the present disclosure with reference to the accompanying drawings in embodiments of the present disclosure.

Figure 4:
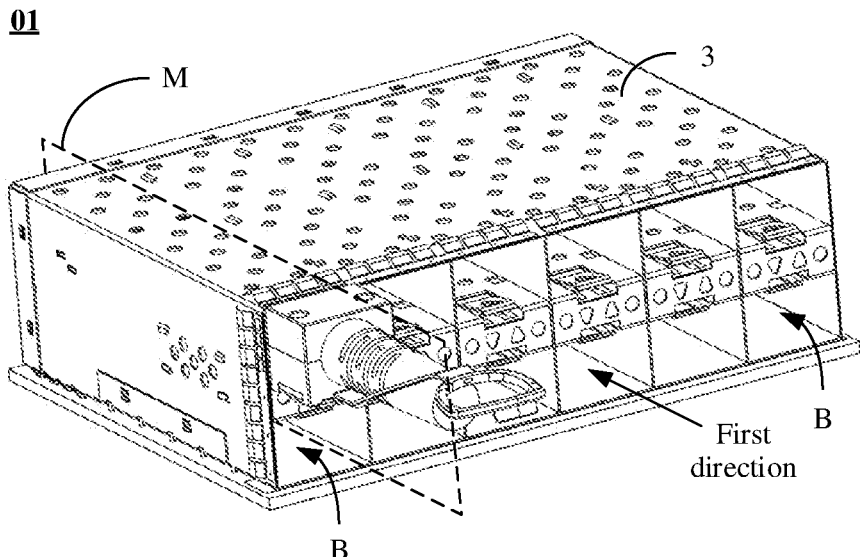
FIG. 4 is a diagram of a structure of an electronic device according to an embodiment of the present disclosure.
Figure 5:
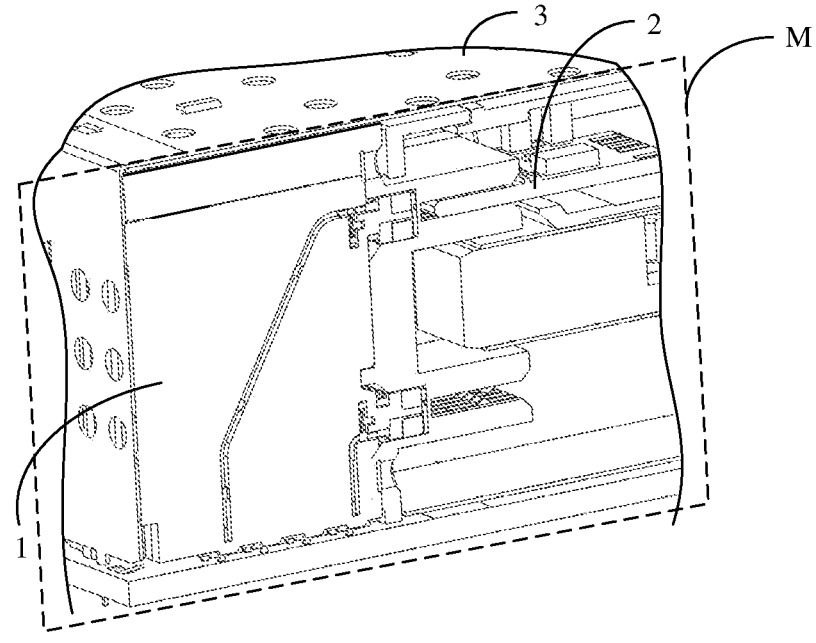
FIG. 5 is a schematic diagram of a cross-sectional structure of M in FIG. 4.

FIG. 4 shows a structure of an electronic device 01 according to an embodiment of the present disclosure. FIG. 5 is a schematic diagram of a cross-sectional structure of a plane M in FIG. 4. It can be learned from the structures shown in FIG. 4 and FIG. 5 that the electronic device 01 includes an electrical connection socket 1, a photoelectric module 2, and a cage 3. The electrical connection socket 1 and the photoelectric module 2 are disposed in a cavity B of the cage 3. One end of the photoelectric module 2 is connected to the electrical connection socket 1, and power and an electrical signal may be transmitted between the electrical connection socket 1 and the photoelectric module. It should be understood that an optical fiber interface and a power supply interface (not shown in the figure) are disposed at the other end of the photoelectric module 2. The cavity B is adapted to a structure of the electrical connection socket 1, and the cavity B may be a two-layer structure shown in FIG. 4, or may be a single-layer structure. In FIG. 4, there are a large quantity of cavities B. Therefore, FIG. 4 shows only an example, and not all cavities B are marked. It should be noted that the quantity of cavities B is not limited to six shown in FIG. 4, and another quantity may be set based on a requirement.

In the structure shown in FIG. 4, an opening is disposed at one end of the cage 3, so that the photoelectric module 2 is plugged into the cavity B from the opening along a first direction, to match with the electrical connection socket 1 disposed in the cavity B of the cage 3. It should be noted that a depth of the cavity B in the first direction along which the photoelectric module 2 and the electrical connection socket 1 are plugged matches a length after the photoelectric module 2 is connected to the electrical connection socket 1.

Figure 6:
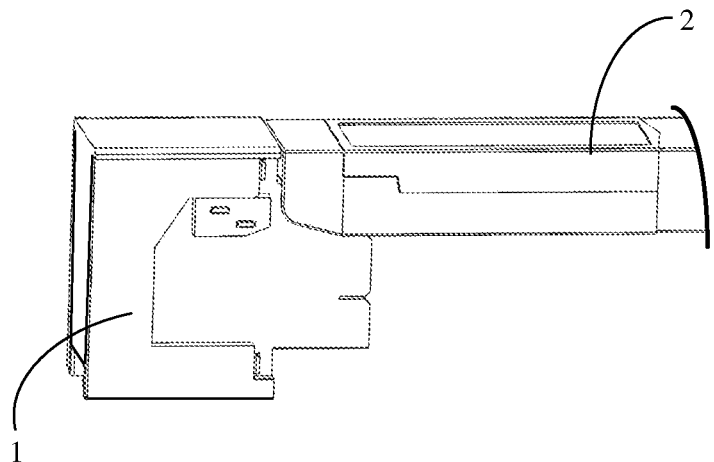
FIG. 6 is a diagram of a structure of a portion of FIG. 4.
Figure 7:
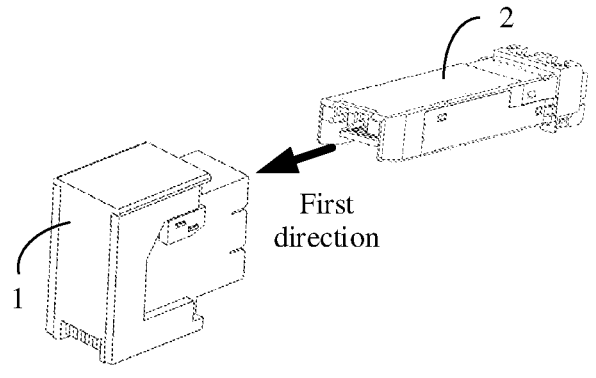
FIG. 7 is a schematic diagram of assembling a structure in FIG. 6.

To more clearly and intuitively indicate a connection relationship between the electrical connection socket 1 and the photoelectric module 2, a structure in FIG. 6 is obtained after the cage 3 of the electronic device 01 shown in FIG. 4 is removed. FIG. 7 shows an adaptation process of the electrical connection socket 1 and the photoelectric module 2. When the photoelectric module 2 is matched with the electrical connection socket 1, the photoelectric module 2 is plugged along the first direction in FIG. 7.

Figure 8:
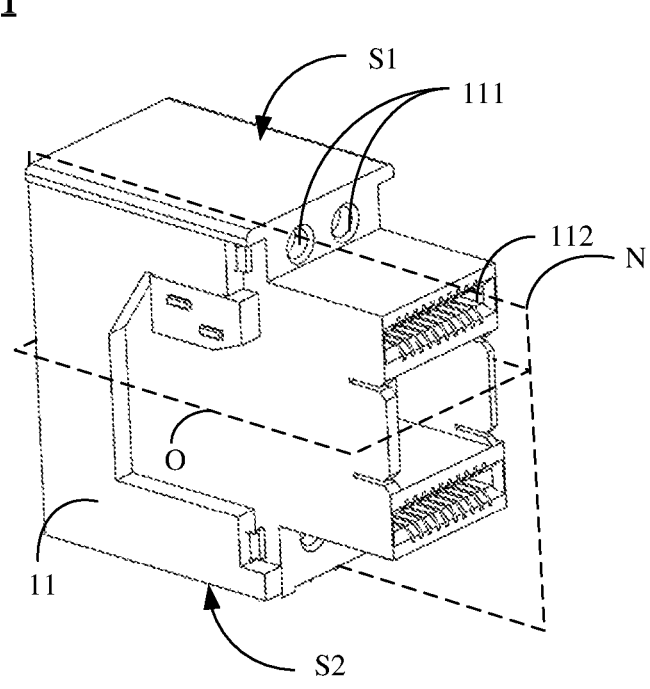
FIG. 8 is a schematic diagram of a structure of an electrical connection socket in FIG. 5.

FIG. 8 is a schematic diagram of a structure of the electrical connection socket 1 in FIG. 5. In the structure shown in FIG. 8, the electrical connection socket 1 includes an insulated substrate 11. For example, the insulated substrate 11 may be prepared by using one or more materials of rubber, resin, or another insulated material. As shown in FIG. 8, the insulated substrate 11 has an upper surface S1, a lower surface S2, and a side surface used to match with a to-be-plugged module. To facilitate plugging between the photoelectric module 2 and the electrical connection socket 1 in FIG. 5, the upper surface S1 and the lower surface S2 of the insulated substrate 11 may be disposed in parallel with each other. In FIG. 8, a plane N is perpendicular to the upper surface S1 and the lower surface S2 of the insulated substrate 11, and a plane O is parallel to the upper surface S1 and the lower surface S2 of the insulated substrate 11.

Figure 9:
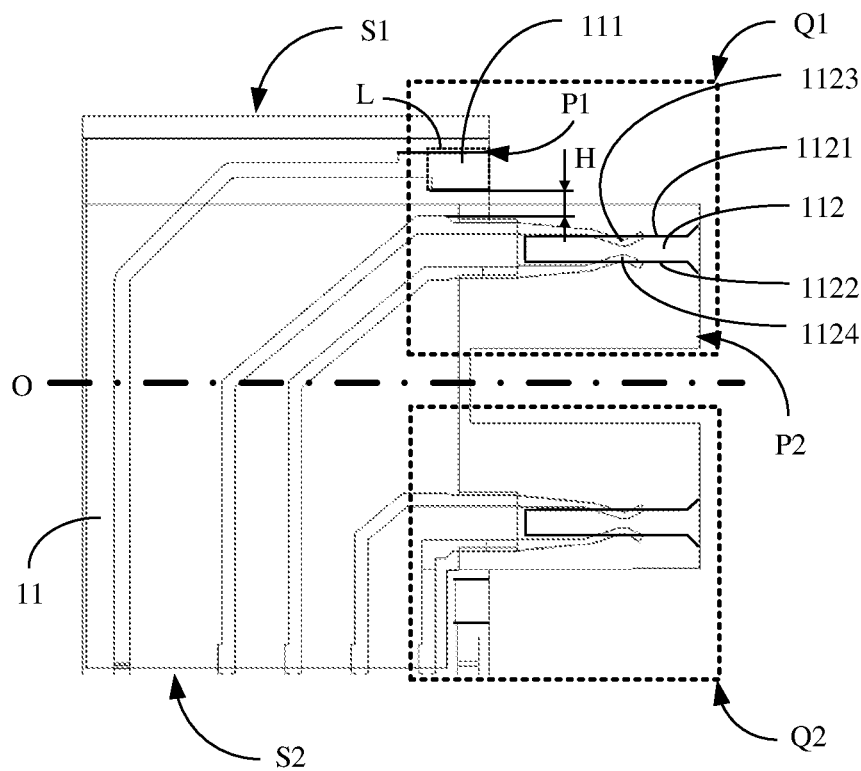
FIG. 9 is a schematic diagram of a cross-sectional structure of a plane N in FIG. 8.

FIG. 9 is a schematic diagram of a cross-sectional structure of the plane N in FIG. 8. With reference to FIG. 8, in the structure shown in FIG. 9, the electrical connection socket 1 includes a plug portion Q1 and a plug portion Q2, the plane O is a central surface of the electrical connection socket 1, and the plug portion Q1 and the plug portion Q2 are symmetrically disposed relative to the central surface O.

The following describes in detail a structure of the plug portion Q1. With reference to FIG. 8, in the structure shown in FIG. 9, the plug portion Q1 includes two power terminals 111 and an electrical signal slot 112. A connection port of the power terminal 111 is located on a side surface P1 of the insulated substrate 11, and an opening of the electrical signal slot 112 is located on a side surface P2 of the insulated substrate 11. It should be understood that, in the electrical connection socket 1 provided in the present disclosure, connection ports for matching the power terminal 111 with the electrical signal slot 112 face a same side of the insulated substrate 11.

It should be understood that a quantity of power terminals 111 in the plug portion Q1 is not limited to two shown in FIG. 4, and a minimum quantity is two. A specific quantity of power terminals 111 may be designed based on a requirement.

In FIG. 9, for example, the power terminal 111 in the plug portion Q1 may be designed as a vertical sheet-like structure. The power terminal 111 has a connection section L, and a connection port of the connection section L is located on the side surface P1 of the insulated substrate 11. It should be noted that an extension direction of the connection section L is parallel to an extension direction of the electrical signal slot 112, and an arrangement direction of the connection section L and the electrical signal slot 112 is perpendicular to the lower surface S1 of the insulated substrate 11. Therefore, the connection section L of the power terminal 111 and the electrical signal slot 112 are arranged vertically. In view of this, a distance between the connection section and the electrical signal slot 112 may be increased by adjusting a position of the connection section L of the power terminal 111, to improve an EMC capability of the electrical connection socket 1 provided in this embodiment, so that the electrical connection socket can meet an EMC certification standard.

In the structure shown in FIG. 9, the electrical signal slot 112 in the plug portion Q1 includes a first inner surface 1121 and a second inner surface 1122 that are disposed opposite to each other. The first inner surface 1121 is opposite to the second inner surface 1122 (the first inner surface 1121 is vertically opposite to the second inner surface 1122 in FIG. 9), an upper signal pin 1123 is disposed on the first inner surface 1121, and a lower signal pin 1124 is disposed on the second inner surface 1122. It should be understood that a quantity of upper signal pins 1123 disposed on the first inner surface 1121 may be set to one or more based on a requirement. Similarly, a quantity of lower signal pins 1124 of the second inner surface 1122 may be set to one or more based on a requirement.

As shown in FIG. 9, one end of each upper signal pin 1123 is located on the first inner surface 1121, and the other end extends from an interior of the insulated substrate 11 to the lower surface S2 of the insulated substrate 11. One end of each lower signal pin 1124 is located on the second inner surface 1122, and the other end extends from the interior of the insulated substrate 11 to the lower surface S2 of the insulated substrate 11.

It should be understood that a minimum distance between the connection section L and the upper signal pin 1123 is H, and the distance H may be designed to increase, to avoid interference of a power supply pulse of the power terminal 111 when the upper signal pin 1123 transmits a high-speed signal at a transmission rate of more than 10 Gbps. This can improve the EMC capability of the electrical connection socket 1 provided in this embodiment, so that the electrical connection socket 1 can meet the EMC certification standard. For example, H may be set to be greater than 1.4 mm. It should be noted that, when the electrical connection socket 1 is matched with the photoelectric module 2 provided in this embodiment, the upper signal pin 1123 in the electrical signal slot 112 bounces up a specific distance in a direction close to the upper surface S1. The minimum distance between the connection section L and the upper signal pin 1123 is a minimum distance between the connection section L and the upper signal pin 1123 after the upper signal pin bounces up.

It is clear that the structure of the connection section L of the power terminal 111 is not limited to the structure in FIG. 9. FIG. 9 is merely a schematic diagram of division to show the minimum distance H between the power terminal 111 and the upper signal pin 1123.

When the electrical connection socket 1 provided in the present disclosure is matched with the photoelectric module 2 provided in the present disclosure, because the photoelectric module 2 is adapted to the structure of the electrical connection socket 1, power and an electrical signal can be transmitted between the photoelectric module 2 and the electrical connection socket 1. A specific structure of the photoelectric module 2 provided in the present disclosure is described in detail subsequently.

It is clear that the electrical connection socket 1 provided in the present disclosure can be connected to the photoelectric module 2 provided in the present disclosure, and can further be applied to various encapsulation interface modules, for example, a small form-factor pluggable (SFP) encapsulated optical module, an electrical interface module, and a quad small form-factor pluggable (QSFP) encapsulated optical module. The electrical signal slot 112 in the electrical connection socket 1 provided in the present disclosure can be adapted to various types of to-be-plugged modules.

Figure 10:
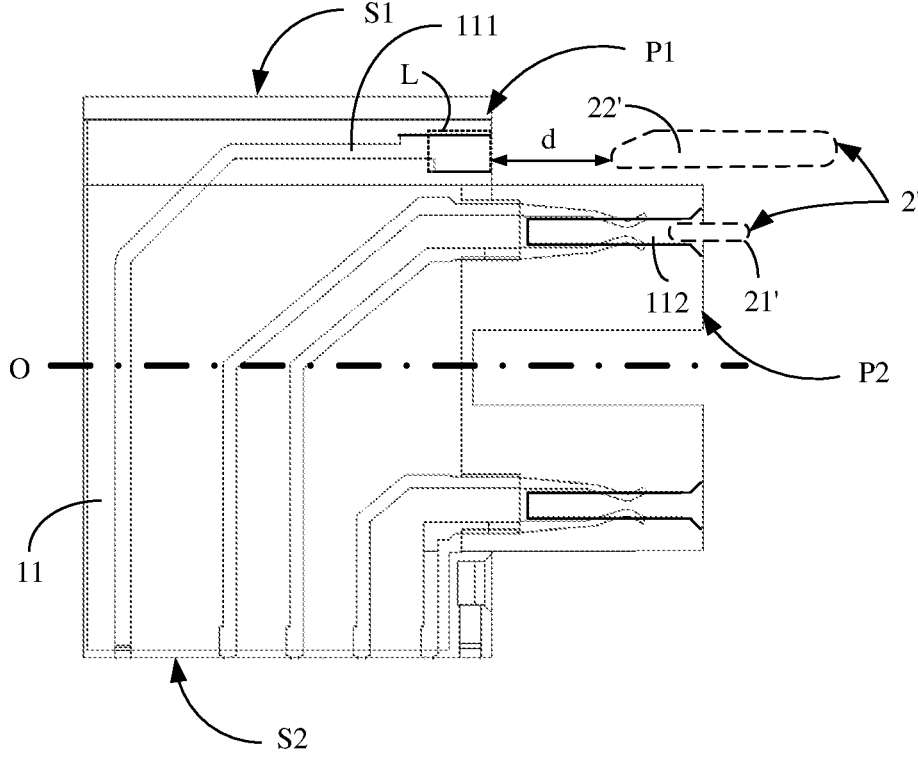
FIG. 10 is a diagram of a structure of matching an electrical connection socket in FIG. 8 with a common module.

When the to-be-plugged module is a common module 2' shown in FIG. 10 (not the photoelectric module 2 provided in the present disclosure), an electrical signal terminal 21' in the to-be-plugged module is plugged into the electrical signal slot 112 in the electrical connection socket 1, to perform signal transmission. Because the common module 2' is not provided with a power supply connection structure, the common module 2' is not connected to the power terminal 111 in the electrical connection socket 1. It should be understood that, because the power terminal 111 in the electrical connection socket 1 provided in the present disclosure is disposed in the insulated substrate 11, and the connection port of the connection section L is located on the side surface P1 of the insulated substrate 11, a distance d between a metal housing 22' in the common module 2' and the connection section L may be increased in a matching direction, to meet a minimum safety isolation distance requirement of 1.4 mm between a 48 V power terminal 111 and the ground, and meet the EMC standard.

Figure 11:
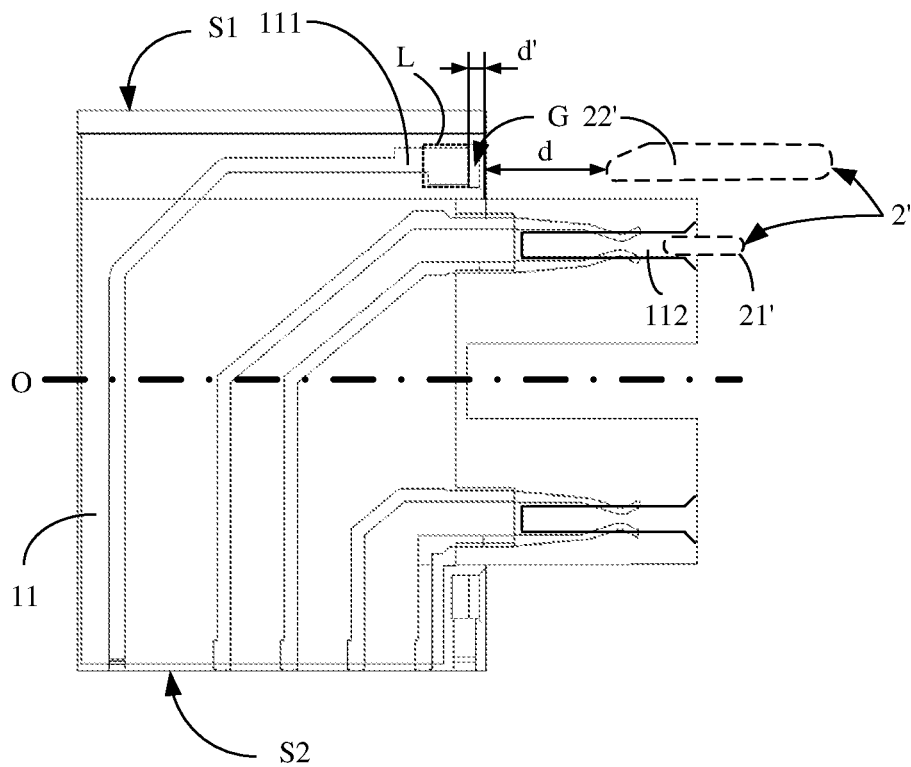
FIG. 11 is a diagram of another structure of matching an electrical connection socket with a common module according to an embodiment of the present disclosure.

It is clear that as a structure shown in FIG. 11, a concave portion G whose opening is located on the side surface P1 is disposed on the insulated substrate 11, and the connection port of the connection section L is disposed on a bottom of the concave portion G. It should be understood that, when the electrical connection socket 1 is matched with the common module 2', in the structure shown in FIG. 11, a distance between the metal housing 22' in the common module 2' and the connection section L includes both the distance d and a depth d' of the concave portion G. In other words, the distance between the metal housing 22' in the common module 2' and the power terminal 111 can further be increased in the matching direction, to better meet the minimum safety isolation distance requirement of 1.4 mm between the 48 V power terminal 111 and the ground, and meet the EMC standard.

The plug portion Q1 and the plug portion Q2 are symmetrically disposed relative to the central surface O, the structure in the plug portion Q2 and the structure in the plug portion Q1 are in a "mirror" state. Therefore, the structure inside the plug portion Q2 is not further described herein.

In addition, the electrical connection socket 1 provided in the present disclosure may alternatively include only the plug portion Q1. In a structure shown in FIG. 12, the power terminal 111, the upper signal pin 1123, and the lower signal pin 1124 are led out from the insulated substrate 11, and fastened to a circuit board 4 through welding or crimping, to form an electrical connection. It should be understood that, when the electrical connection socket 1 provided in the present disclosure includes only the plug portion Q1, the cage 3 shown in FIG. 4 is of a single-layer structure.

Figure 12:
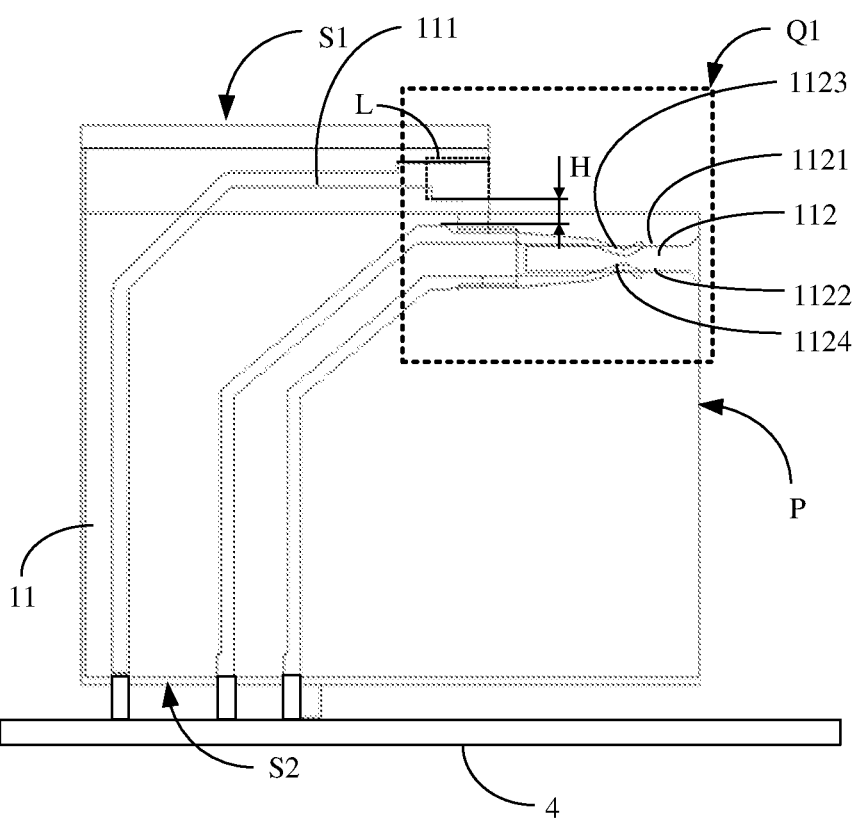
FIG. 12 is a schematic diagram of another structure of an electrical connection socket according to an embodiment of the present disclosure.
Figure 13:
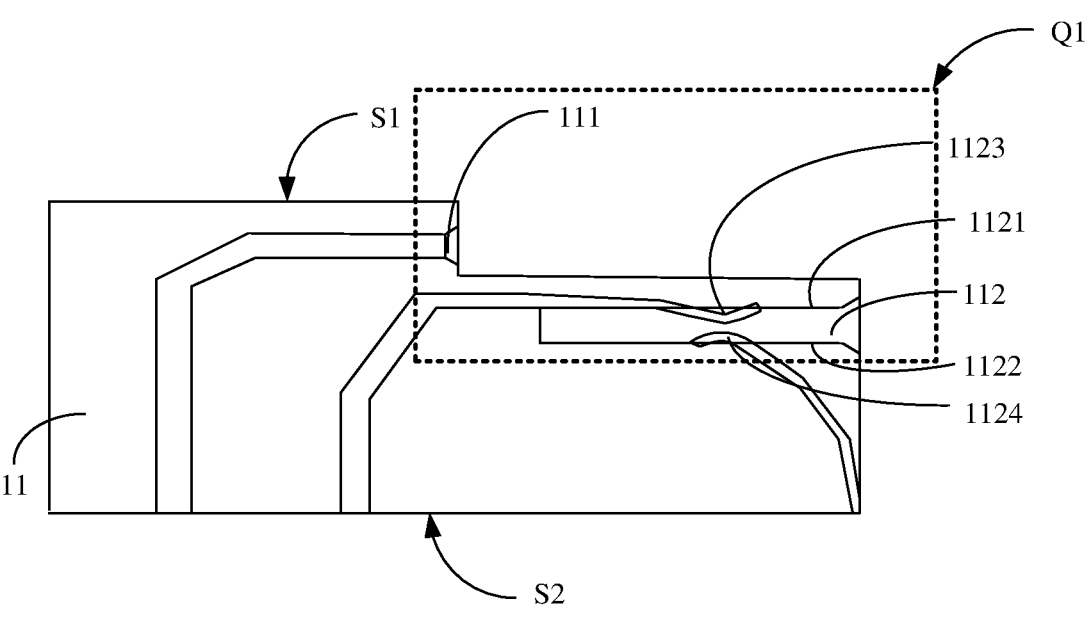
FIG. 13 is a schematic diagram of another structure of an electrical connection socket according to an embodiment of the present disclosure.

It should be noted that in the structure shown in FIG. 12, both the upper signal pin 1123 and the lower signal pin 1124 are led out from a back end of the lower surface S2 through a metal lead. It is clear that the lower signal pin 1124 may be led out from the front end of the lower surface S2 in the structure shown in FIG. 13, to facilitate welding. It should be understood that lead-out locations of the upper signal pin 1123 and the lower signal pin 1124 may be set based on a requirement. It should be noted that the "front end" and the "back end" are relative concepts. The "front end" is a location in which the lower surface S2 is close to the side surface. Correspondingly, the "back end" is a location in which the lower surface S2 is away from the side surface.

Figure 14:
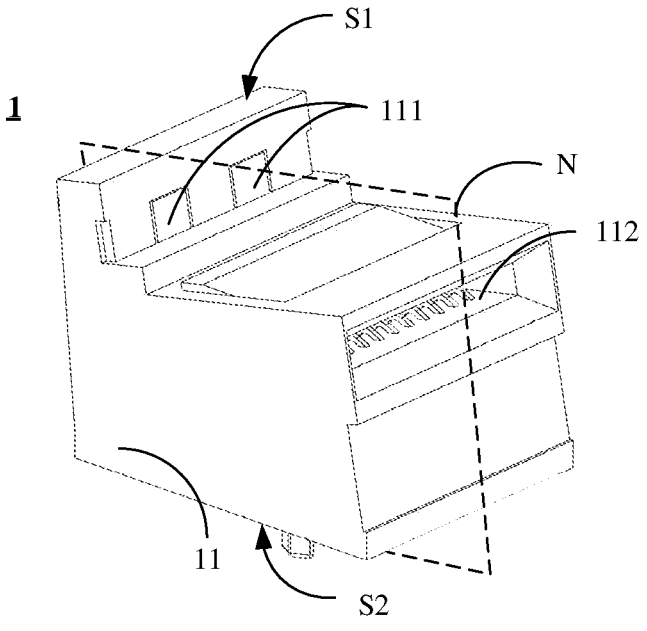
FIG. 14 is a schematic diagram of another structure of an electrical connection socket according to an embodiment of the present disclosure.
Figure 15:
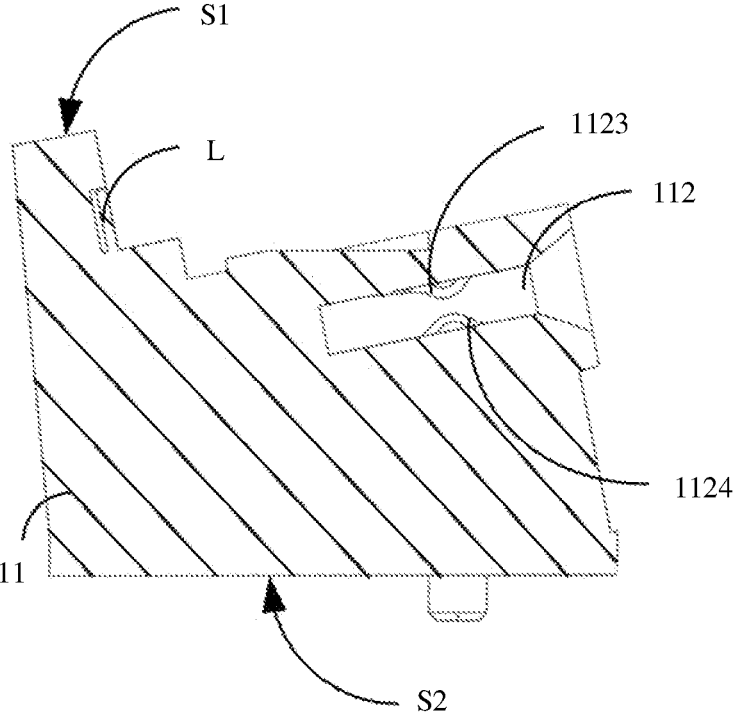
FIG. 15 is a schematic diagram of a cross-sectional structure of N in FIG. 14.

It is clear that, in the structure shown in FIG. 14, an included angle may alternatively exist between the extension direction of the electrical signal slot 122 and the lower surface S2 of the insulated substrate 11. FIG. 15 is a cross-sectional view of N in FIG. 14. It can be clearly seen from the structure shown in FIG. 15 that the extension direction of the connection section L is parallel to the extension direction of the electrical signal slot 112, and neither of the extension directions is parallel to the lower surface S2 of the insulated substrate 11. It should be understood that the included angle between the extension direction of the electrical signal slot 112 and the lower surface S2 of the insulated substrate 11 in FIG. 15 may be designed based on a requirement.

Figure 16:
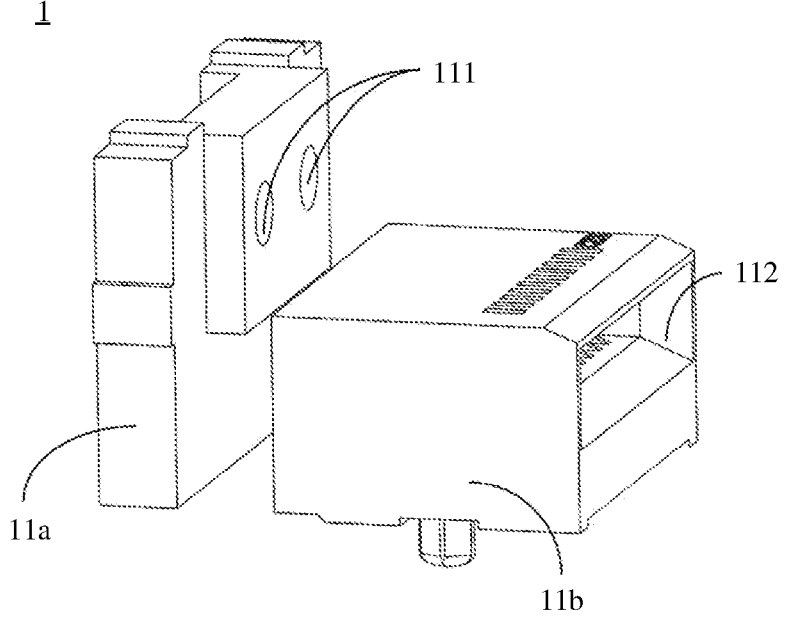
FIG. 16 is a schematic diagram of another structure of an electrical connection socket according to an embodiment of the present disclosure.

In addition, the insulated substrate 11 may be disposed as two separate parts. In a structure shown in FIG. 16, the power terminal 111 is disposed on a first insulated substrate 11a, and a second insulated substrate 11b is provided with the electrical signal slot 112. During assembly, the power terminal 111 and the electrical signal slot 112 in the electrical connection socket 1 may be disposed based on a requirement. It should be understood that, in the electrical connection socket 1 shown in FIG. 10, the insulated substrate 11 may alternatively be disposed as two independent parts. In other words, the power terminals 111 in the plug portion Q1 and the plug portion Q2 are disposed on one insulated substrate, and the electrical signal slots 112 in the plug portion Q1 and the plug portion Q2 are disposed on another insulated substrate.

Figure 17:
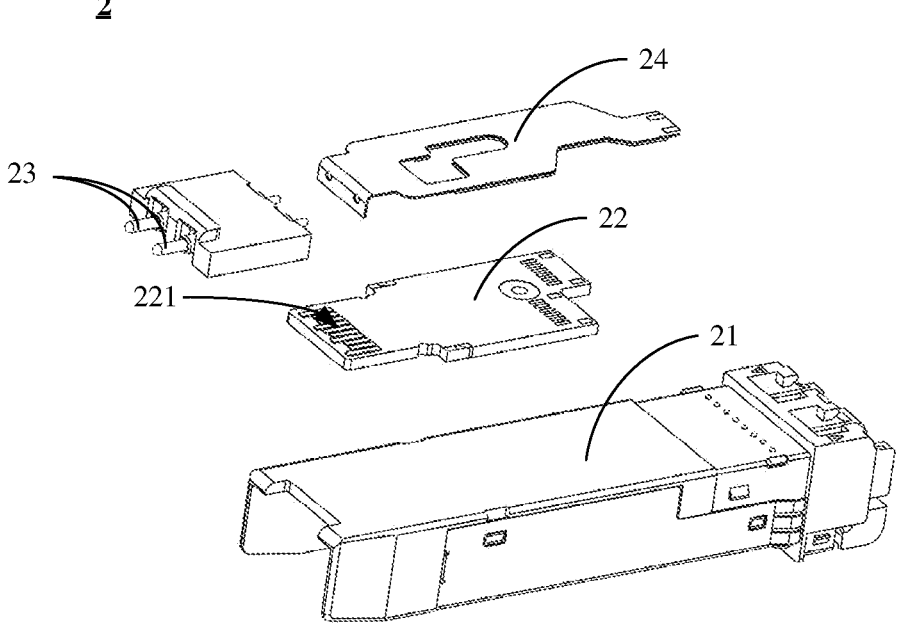
FIG. 17 is an exploded view of a photoelectric module in FIG. 5.
Figure 18:
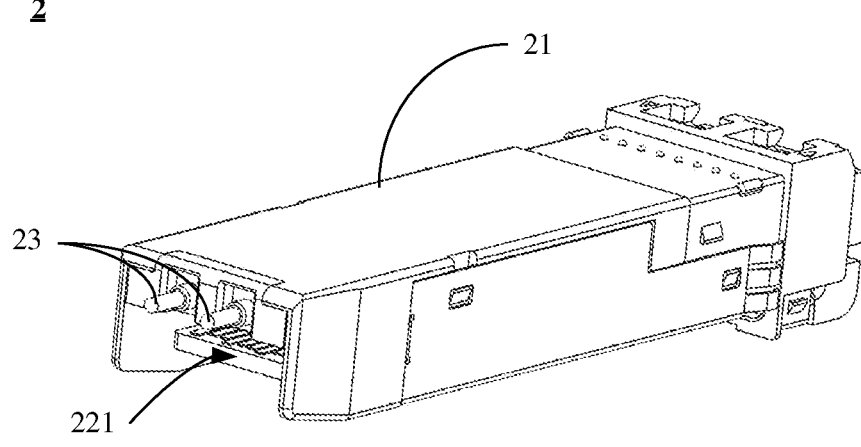
FIG. 18 is a schematic diagram of a structure of a photoelectric module in FIG. 17.

FIG. 17 is an exploded view of the photoelectric module 2 in FIG. 5. The photoelectric module 2 includes a housing 21, a circuit board 22, two power terminals 23, and a flexible circuit board 24. One end of each power terminal 23 extends from a front end of the housing 21, another end is connected to the flexible circuit board 24, and each power terminal 23 is insulated from the housing 21. An electrical signal terminal 221 is disposed on one end of the circuit board 22. It should be understood that a quantity of power terminals 23 disposed on the photoelectric module 2 may be set based on a requirement. After the components in FIG. 17 are assembled, a structure in FIG. 18 is formed. FIG. 18 shows a state in which each power terminal 23 extends from the housing 21.

When the photoelectric module 2 provided in this embodiment is matched with the electrical connection socket 1, and the electrical connection socket 1 is the electrical connection socket 1 shown in FIG. 9 in the present disclosure, the power terminals 23 in the photoelectric module 2 one-to-one correspond to the power terminals 111 in the electrical connection socket 1 shown in FIG. 9, and each power terminal 23 in the photoelectric module 2 extends into the connection sections L, that one-to-one correspond to the power terminals 23, of the electrical connection socket 1, to transmit power between the photoelectric module 2 and the electrical connection socket 1. In addition, the electrical signal terminal 221 in the photoelectric module 2 is connected to the electrical signal slot 112 in the electrical connection socket 1, to transmit a signal.

Figure 19:
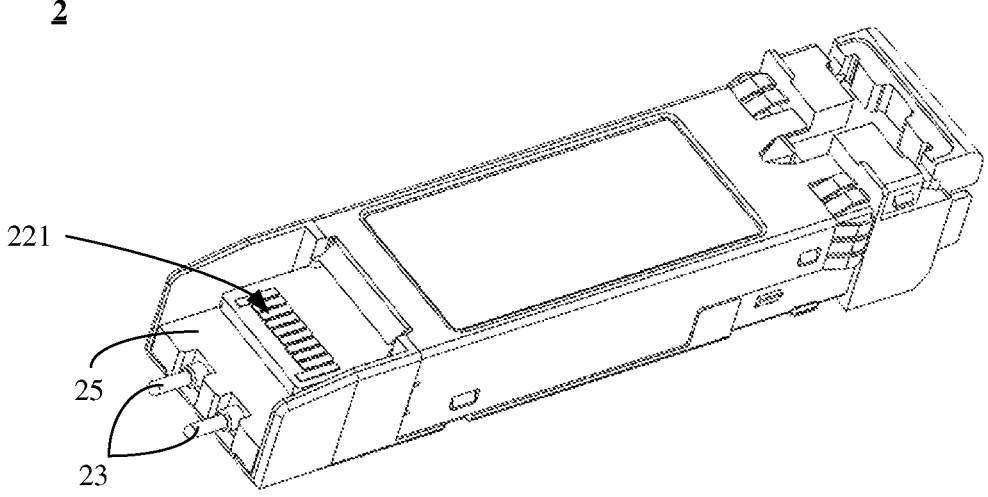
FIG. 19 is a schematic diagram of another structure of a photoelectric module in FIG. 17.

During specific setting, because a preparation material of the housing 21 is usually metal, an insulated structure between the power terminal 23 and the housing 21 may be shown in FIG. 19. An insulated substrate 25 may be separately disposed, to separate each power terminal 23 from the housing 21 by using the insulated substrate 25. The insulated substrate 25 may be prepared by using one or more materials of rubber, resin, or another insulated material.

Figure 20:
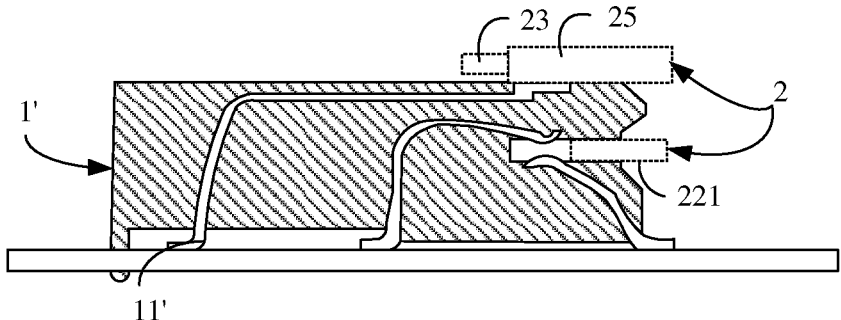
FIG. 20 is a schematic diagram of a structure of matching an electrical connection socket with a common module according to an embodiment of the present disclosure.

The photoelectric module 2 provided in this embodiment may be matched with the electrical connection socket 1 provided in this embodiment, and may further be connected to a common electrical connection socket 1' (a socket different from the electrical connection socket 1 provided in this embodiment is defined as a common electrical connection socket 1') shown in FIG. 20. In the structure shown in FIG. 20, the electrical signal terminal 221 in the photoelectric module 2 is electrically connected to the common electrical connection socket 1' to implement electrical signal transmission. The power terminal 23 in the photoelectric module 2 does not match a power terminal 11' in the common electrical connection socket 1', and power is not transmitted. It should be understood that the insulated substrate 25 in the photoelectric module 2 covers an exposed portion of the power terminal 11', to isolate the exposed portion from the housing 21 in the photoelectric module 2.

When the photoelectric module 2 provided in this embodiment is matched with the common electrical connection socket 1', the power terminal 23 in the photoelectric module 2 abuts against a side surface of the common electrical connection socket 1'. In view of this, the power terminal 23 shown in FIG. 20 may be disposed as a telescopic structure.

Figure 21:
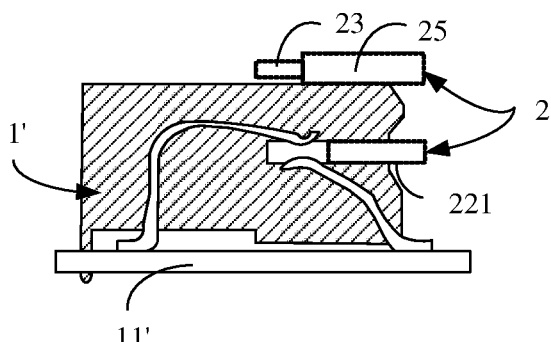
FIG. 21 is a schematic diagram of another structure of matching a electrical connection socket with a common module according to an embodiment of the present disclosure.

It is clear that the common electrical connection socket 1' is not limited to the structure in FIG. 20, and is merely an example for schematic descriptions. For example, the photoelectric module 2 provided in the present disclosure may alternatively be matched with the common electrical connection socket 1' shown in FIG. 21. The common electrical connection socket 1' in FIG. 21 has only a signal connection function.

It should be understood that, when the photoelectric module 2 provided in the present disclosure is matched with the electrical connection socket 1 provided in the present disclosure, the electrical connection socket 1 may have a different electrical signal slot 112 based on a different model of the electrical signal terminal 221 in the photoelectric module 2. For example, when the electrical signal terminal 221 in the photoelectric module 2 is a multi-source agreement (MSA) edge connector terminal, the electrical signal slot 112 in the electrical connection socket 1 may be an MSA edge connector slot.

It should be noted that, the photoelectric module 2 provided in the present disclosure may be prepared by adding at least one pair of telescopic elastic power terminals 23 based on a current standard small form-factor pluggable (SFP) module.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An electrical connection socket, comprising an insulated substrate, wherein the insulated substrate has an upper surface, a lower surface, and a side surface adapted to match with a to-be-plugged module, the insulated substrate comprises at least one plug portion, and each of the at least one plug portion comprises an electrical connection area adapted to connect to a power terminal of the to-be-plugged module and a signal connection area adapted to connect to a signal terminal of the to-be-plugged module, wherein the insulated substrate is configured to be disposed on a front end of a housing;

at least two power terminals are disposed in the electrical connection area, one end of each of the at least two power terminals is disposed in the insulated substrate, the other end of the power terminal extends to the lower surface of the insulated substrate through the insulated substrate, each of the at least two power terminals has a connection section adapted to connect to the power terminal of the to-be-plugged module, and a connection port of the connection section is located on the side surface of the insulated substrate, wherein the at least two power terminals are telescopically disposed inside the insulated substrate, and the other end of each of the at least two power terminals is configured to protrude from the housing and be connected to a circuit board in the housing; and the signal connection area is provided with an electrical signal slot, an opening of the electrical signal slot is located on the side surface of the insulated substrate, the electrical signal slot extends beyond the connection section, and along a direction perpendicular to the lower surface, the electrical signal slot and the connection section are of different heights.

2. The electrical connection socket according to claim 1, wherein the insulated substrate has a concave portion whose opening is located on the side surface, and the connection port of the connection section is located on a bottom of the concave portion.

3. The electrical connection socket according to claim 1, wherein the electrical connection socket comprises a first inner surface and a second inner surface that are disposed opposite to each other, and along a direction from the upper surface to the lower surface of the insulated substrate, the electrical connection socket further comprises:

at least one upper signal pin, wherein one end of each of the at least one upper signal pin is located on the first inner surface, and an other end of the upper signal pin extends from an interior of the insulated substrate to the lower surface of the insulated substrate through a metal lead; and at least one lower signal pin, wherein one end of each of the at least one lower signal pin is located on the second inner surface, and the other end of the lower signal pin extends from the interior of the insulated substrate to the lower surface of the insulated substrate through the metal lead.

4. The electrical connection socket according to claim 3, wherein an extension direction of the connection section of the power terminal is parallel to an extension direction of the electrical signal slot, and along an arrangement direction of the connection section and the electrical signal slot, a distance between the connection section of the power terminal and the upper signal pin is greater than 1.4 mm.

5. The electrical connection socket according to claim 1, wherein the electrical connection socket comprises one plug portion, the insulated substrate comprises a first insulated substrate and a second insulated substrate, the power terminal is disposed on the first insulated substrate, and the second insulated substrate is provided with the electrical signal slot; and the first insulated substrate and the second insulated substrate are of an integrated structure, or the first insulated substrate and the second insulated substrate are of a split structure.

6. The electrical connection socket according to claim 1, wherein the insulated substrate has a central surface, the central surface is located between the upper surface and the lower surface and is parallel to the lower surface, the insulated substrate comprises two plug portions that are symmetrically disposed relative to the central surface.

7. A photoelectric module, comprising:

a housing;

a circuit board disposed in the housing, wherein an electrical signal terminal is disposed on the circuit board, and the electrical signal terminal is configured to be plugged and connected to an electrical signal slot of an electrical connection socket, comprising an insulated substrate, wherein the insulated substrate has an upper surface, a lower surface, and a side surface adapted to match with a to-be-plugged module, the insulated substrate comprises at least one plug portion, and each of the at least one plug portion comprises an electrical connection area adapted to connect to a power terminal of the to-be-plugged module and a signal connection area adapted to connect to a signal terminal of the to-be-plugged module;

at least two first power terminals are disposed in the electrical connection area, one end of each of the at least two first power terminals is disposed in the insulated substrate, the other end of the first power terminal extends to the lower surface of the insulated substrate through the insulated substrate, each of the at least two first power terminals has a connection section adapted to connect to the power terminal of the to-be-plugged module, and a connection port of the connection section is located on the side surface of the insulated substrate; and the signal connection area is provided with an electrical signal slot, an opening of the electrical signal slot is located on the side surface of the insulated substrate, the electrical signal slot extends beyond the connection section, and along a direction perpendicular to the lower surface, the electrical signal slot and the connection section are of different heights; and at least two second power terminals, wherein the at least two second power terminals are insulated from the housing, one end of the at least two second power terminals protrudes from a front end of the housing, another end of the second power terminal is connected to a circuit board in the housing, and the at least two second power terminals are electrically connected to at least two first power terminals of the electrical connection socket in a one-to-one correspondence, to couple a power supply voltage to an electronic device, wherein an insulated substrate is disposed on the front end of the housing, the at least two first power terminals are telescopically disposed inside the insulated substrate, one end of each of the at least two first power terminals passes through the insulated substrate and protrudes from the housing, and another end of the first power terminal passes through the insulated substrate and is connected to the circuit board in the housing.

8. The photoelectric module according to claim 7, wherein the electrical signal terminal is a multi-source agreement (MSA) edge connector terminal.

9. The photoelectric module according to claim 8, wherein the photoelectric module is a small form-factor pluggable (SFP) module.

10. A cage, comprising a cage housing and a cavity enclosed by the cage housing, wherein the cavity is configured to accommodate an electrical connection socket, comprising an insulated substrate, wherein the insulated substrate has an upper surface, a lower surface, and a side surface adapted to match with a to-be-plugged module, the insulated substrate comprises at least one plug portion, and each of the at least one plug portion comprises an electrical connection area adapted to connect to a power terminal of the to-be-plugged module and a signal connection area adapted to connect to a signal terminal of the to-be-plugged module;

at least two first power terminals are disposed in the electrical connection area, one end of each of the at least two first power terminals is disposed in the insulated substrate, the other end of the first power terminal extends to the lower surface of the insulated substrate through the insulated substrate, each of the at least two first power terminals has a connection section adapted to connect to the power terminal of the to-be-plugged module, and a connection port of the connection section is located on the side surface of the insulated substrate; and the signal connection area is provided with an electrical signal slot, an opening of the electrical signal slot is located on the side surface of the insulated substrate, the electrical signal slot extends beyond the connection section, and along a direction perpendicular to the lower surface, the electrical signal slot and the connection section are of different heights;

a photoelectric module comprising a housing, and a circuit board disposed in the housing, wherein an electrical signal terminal is disposed on the circuit board, and the electrical signal terminal is configured to be plugged and connected to the electrical signal slot of the electrical connection socket; and at least two second power terminals, wherein the at least two second power terminals are insulated from the housing, one end of the at least two second power terminals protrudes from a front end of the housing, another end of the second power terminal is connected to a flexible circuit board in the housing, and the at least two second power terminals are electrically connected to at least two first power terminals of the electrical connection socket in a one-to-one correspondence, to couple a power supply voltage to an electronic device.

11. An electronic device, comprising an electrical connection socket comprising an insulated substrate, wherein the insulated substrate has an upper surface, a lower surface, and a side surface adapted to match with a to-be-plugged module, the insulated substrate comprises at least one plug portion, and each of the at least one plug portion comprises an electrical connection area adapted to connect to a power terminal of the to-be-plugged module and a signal connection area adapted to connect to a signal terminal of the to-be-plugged module;

at least two first power terminals are disposed in the electrical connection area, one end of each of the at least two first power terminals is disposed in the insulated substrate, the other end of the first power terminal extends to the lower surface of the insulated substrate through the insulated substrate, each of the at least two first power terminals has a connection section adapted to connect to the first power terminal of the to-be-plugged module, and a connection port of the connection section is located on the side surface of the insulated substrate; and the signal connection area is provided with an electrical signal slot, an opening of the electrical signal slot is located on the side surface of the insulated substrate, the electrical signal slot extends beyond the connection section, and along a direction perpendicular to the lower surface, the electrical signal slot and the connection section are of different heights;

a photoelectric module comprising a housing, and a circuit board disposed in the housing, wherein an electrical signal terminal is disposed on the circuit board, and the electrical signal terminal is configured to be plugged and connected to the electrical signal slot of the electrical connection socket; and at least two second power terminals, wherein the at least two second power terminals are insulated from the housing, one end of the at least two second power terminals protrudes from a front end of the housing, another end of the second power terminal is connected to a flexible circuit board in the housing, and the at least two second power terminals are electrically connected to at least two first power terminals of the electrical connection socket in a one-to-one correspondence, to couple a power supply voltage to an electronic device.

* * * * *